(12) United States Patent
Choi et al.

(10) Patent No.: US 8,339,325 B2
(45) Date of Patent: *Dec. 25, 2012

(54) WIRELESS ENERGY TRANSMISSION STRUCTURE

(75) Inventors: Jae Won Choi, Seoul (KR); Chul Hun Seo, Seoul (KR); Chong Min Lee, Seoul (KR); Du Won Jung, Jeollanam-do (KR); Yang Hyun Kim, Ulsan (KR); Eung Ju Kim, Gyunggi-do (KR); Kwang Du Lee, Gyunggi-do (KR); Jung Ho Yoon, Gyunggi-do (KR); Jeong Hoon Kim, Seoul (KR); Sang Hoon Hwang, Seoul (KR); Chul Gyun Park, Gyunggi-do (KR); Jung Aun Lee, Gyunggi-do (KR)

(73) Assignees: Samsung Electro-Mechanics Co., Ltd., Suwon, Gyunggi-Do (KR); Soongsil University Research Consortium Techno-Park, Seoul (KR)

( * ) Notice: Subject to any disclaimer, the term of this patent is extended or adjusted under 35 U.S.C. 154(b) by 324 days.

This patent is subject to a terminal disclaimer.

(21) Appl. No.: 12/757,490

(22) Filed: Apr. 9, 2010

(65) Prior Publication Data
US 2011/0193415 A1 Aug. 11, 2011

(30) Foreign Application Priority Data
Feb. 8, 2010 (KR) ........................ 10-2010-0011582

(51) Int. Cl.
*H01Q 19/06* (2006.01)
(52) U.S. Cl. .................. 343/753; 343/700 MS; 307/104

(58) Field of Classification Search ........... 343/700 MS, 343/753, 909; 307/104; 333/239
See application file for complete search history.

(56) References Cited

U.S. PATENT DOCUMENTS
6,933,812 B2* 8/2005 Sarabandi et al. ............ 333/219
(Continued)

FOREIGN PATENT DOCUMENTS
KR  10-2007-0050051  5/2007

OTHER PUBLICATIONS
Office Action from counterpart Korean Patent Application No. 10-2010-0011582, mailed May 31, 2011, 4 pages.
(Continued)

*Primary Examiner* — Tho G Phan
(74) *Attorney, Agent, or Firm* — Blakely Sokoloff Taylor & Zafman LLP

(57) ABSTRACT

Disclosed is a wireless energy transmission structure which includes a disc part including a first conductor plate and a second conductor plate which are spaced to face each other and a dielectric material inserted between the first conductor plate and the second conductor plate, and generating an electric field between the first conductor plate and the second conductor plate; and a ring-shaped wire part one end of which is connected to the first conductor plate and the other end of which is connected to the second conductor plate, and having a meta structure in which a plurality of meta cells is repetitively arranged so as to induce a magnetic field using the electric field, so that the wireless energy transmission structure is reduced in size and is improved in transmission distance and transmission efficiency.

8 Claims, 7 Drawing Sheets

U.S. PATENT DOCUMENTS

| | | | |
|---|---|---|---|
| 7,911,386 B1 * | 3/2011 | Itoh et al. | 343/700 MS |
| 2008/0024792 A1 | 1/2008 | Pendry | |
| 2010/0109445 A1 | 5/2010 | Kurs | |
| 2010/0259345 A1 * | 10/2010 | Kim et al. | 333/239 |
| 2010/0277005 A1 | 11/2010 | Karalis | |
| 2011/0133568 A1 | 6/2011 | Wang | |
| 2011/0266879 A1 * | 11/2011 | Kim et al. | 307/104 |
| 2011/0267247 A1 * | 11/2011 | Choi et al. | 343/753 |

OTHER PUBLICATIONS

John Pendry, "Manipulating the Near Filed With Metamaterials", Sep. 2004, Optics & Photonics News, pp. 1-6.

Office Action from counterpart U.S. Appl. No. 12/848,915, mailed Sep. 28, 2012, 15 pages.

* cited by examiner

WIRELESS ENERGY TRANSMISSION STRUCTURE

CROSS REFERENCE TO RELATED APPLICATION

This application claims the benefit of Korean Patent Application No. 10-2010-0011582, filed Feb. 8, 2010, entitled "Wireless energy transmission structure", which is hereby incorporated by reference in its entirety into this application.

BACKGROUND OF THE INVENTION

1. Technical Field

The present invention relates to a wireless energy transmission structure.

2. Description of the Related Art

The advancement of wireless communication technology has resulted in an environment of ubiquitous information where anyone may send and receive the desired information at any time and anywhere.

However, communication information devices are still dependent on batteries, and the use thereof is limited because it is supplied with power by means of a wire power cable.

In order to solve these problems, numerous techniques for wirelessly transferring power are being developed.

For example, a microwave receiving method using microwaves, a magnetic induction method using magnetic field, and a magnetic resonance method using the conversion of the energy of magnetic and electric fields are typical.

The microwave receiving method is advantageous because microwaves are radiated through the air by an antenna so that power can be transmitted over a distance, but is limited in that the power transmission efficiency is low attributable to a very large radiation loss in the air.

The magnetic induction method is advantageous in terms of high power transmission efficiency because of using magnetic energy coupling by means of transmission-side primary coil and receiving-side secondary coil.

However, the magnetic induction method is problematic in that the transmission-side primary coil and the receiving-side secondary coil should be adjacent to each other on the order of about as short as ones of millimeters in order to transmit power.

Also, depending on the coil alignment of the transmission-side primary coil and the receiving-side secondary coil, power transmission efficiency is drastically changed, and the heat value is undesirably large.

Therefore, the magnetic resonance method is being developed, which is similar to the magnetic induction method except for that it focuses energy at a specific resonance frequency using a coil type inductor L and capacitor C so that power is transmitted in the form of magnetic energy.

The magnetic resonance method is advantageous because a relatively large amount of power may be sent up to ones of meters, but requires a high quality factor.

As such, the conventional wireless energy transmission structure for using the magnetic resonance method includes a disc part including two conductor plates and a dielectric material inserted between the two conductor plates, and a ring-shaped wire part connected to both ends of the disc part. In order to achieve a high quality factor, the magnitude of the electric and magnetic fields occurring from the disc part and the wire part should be large.

However, the conventional wireless energy transmission structure is not suitable for use in an actual wireless power transceiver because the sizes of the disc and wire parts should be increased to increase the magnitude of the electric and magnetic fields.

SUMMARY OF THE INVENTION

Accordingly, the present invention has been made keeping in mind the problems encountered in the related art and the present invention is intended to provide a wireless energy transmission structure, which has a meta structure and is thus reduced in size and is improved in transmission distance and transmission efficiency.

An aspect of the present invention provides a wireless energy transmission structure, including a disc part including a first conductor plate and a second conductor plate which are spaced to face each other and a dielectric material inserted between the first conductor plate and the second conductor plate, and generating an electric field between the first conductor plate and the second conductor plate; and a ring-shaped wire part one end of which is connected to the first conductor plate and the other end of which is connected to the second conductor plate, and having a meta structure in which a plurality of meta cells is repetitively arranged so as to induce a magnetic field using the electric field.

In this aspect, the wire part may include a ring-shaped substrate one end of which is connected to the first conductor plate and the other end of which is connected to the second conductor plate; a horizontal type meta structure including a first meta structure in which a plurality of meta cells is repetitively formed along an inner peripheral portion of the substrate on one surface of the substrate, and a second meta structure spaced apart from the first meta structure on the same surface where the first meta structure is formed and having a plurality of meta cells which are repetitively formed along an outer peripheral portion of the substrate; and a transmission line, which has a first terminal and a second terminal, is formed along the first meta structure and the second meta structure of the substrate between the first meta structure and the second meta structure, and supplies or receives power through the first terminal and the second terminal. As such, the substrate may be a single substrate or a multilayer substrate.

In addition, in this aspect, the wire part may include a ring-shaped multilayer substrate one end of which is connected to the first conductor plate and the other end of which is connected to the second conductor plate, and including an uppermost substrate and a lowermost substrate so that at least two dielectric substrates are stacked; a vertical type meta structure including a first meta structure formed on the upper surface of the uppermost substrate of the multilayer substrate and having a plurality of meta cells which are repetitively formed, and a second meta structure formed on the lower surface of the lowermost substrate of the multilayer substrate and having a plurality of meta cells which are repetitively formed; a transmission line, which has a first terminal and a second terminal, is interposed between the uppermost substrate and the lowermost substrate and formed along the first meta structure and the second meta structure of the substrate, and supplies or receives power through the first terminal and the second terminal; and a plurality of via holes formed to perpendicularly pass through the multilayer substrate so as to electrically connect the plurality of meta cells and the transmission line.

As such, in the vertical type meta structure, when the width of the transmission line is equal to or larger than the width of the first meta structure and the second meta structure, series resonance may be obtained at a resonance frequency.

Also, in the vertical type meta structure, when the width of the transmission line is smaller than the width of the first meta structure and the second meta structure, parallel resonance may be obtained at a resonance frequency.

Furthermore, the plurality of via holes may include a plurality of first via holes formed to perpendicularly pass through the multilayer substrate so as to electrically connect the plurality of meta cells of the first meta structure to the transmission line; and a plurality of second via holes formed to perpendicularly pass through the multilayer substrate so as to electrically connect the plurality of meta cells of the second meta structure to the transmission line.

BRIEF DESCRIPTION OF THE DRAWINGS

The features and advantages of the present invention will be more clearly understood from the following detailed description taken in conjunction with the accompanying drawings, in which.

DESCRIPTION OF SPECIFIC EMBODIMENTS

Figure 1:
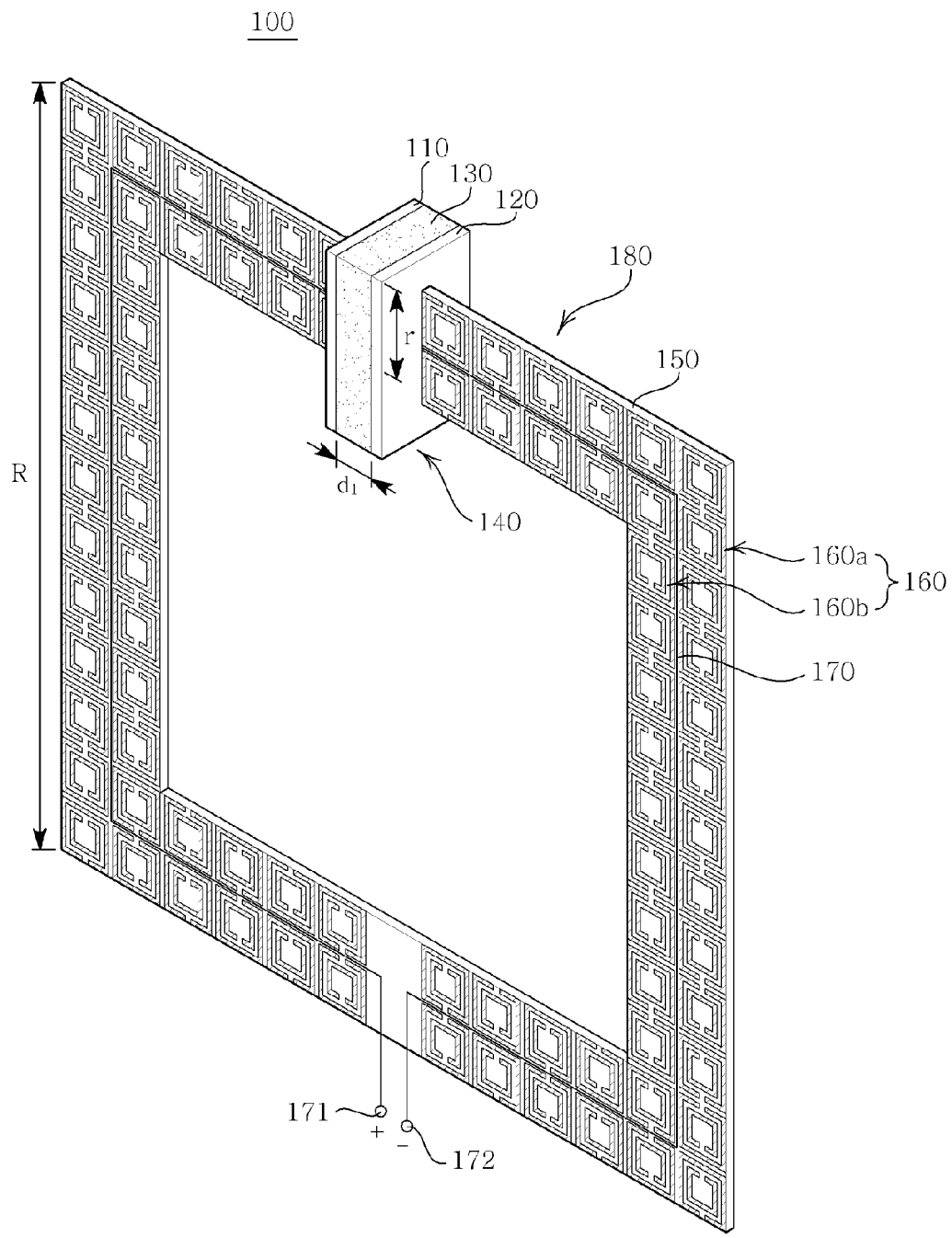
FIG. 1 is a perspective view showing a wireless energy transmission structure according to a first embodiment of the present invention.

Hereinafter, embodiments of the present invention will be described in detail while referring to the accompanying drawings. Throughout the drawings, the same reference numerals are used to refer to the same or similar elements. Moreover, descriptions of known techniques, even if they are pertinent to the present invention, are regarded as unnecessary and may be omitted when they would make the characteristics of the invention and the description unclear.

Furthermore, the terms and words used in the present specification and claims should not be interpreted as being limited to typical meanings or dictionary definitions, but should be interpreted as having meanings and concepts relevant to the technical scope of the present invention based on the rule according to which an inventor can appropriately define the concept implied by the term to best describe the method he or she knows for carrying out the invention.

Figure 2:
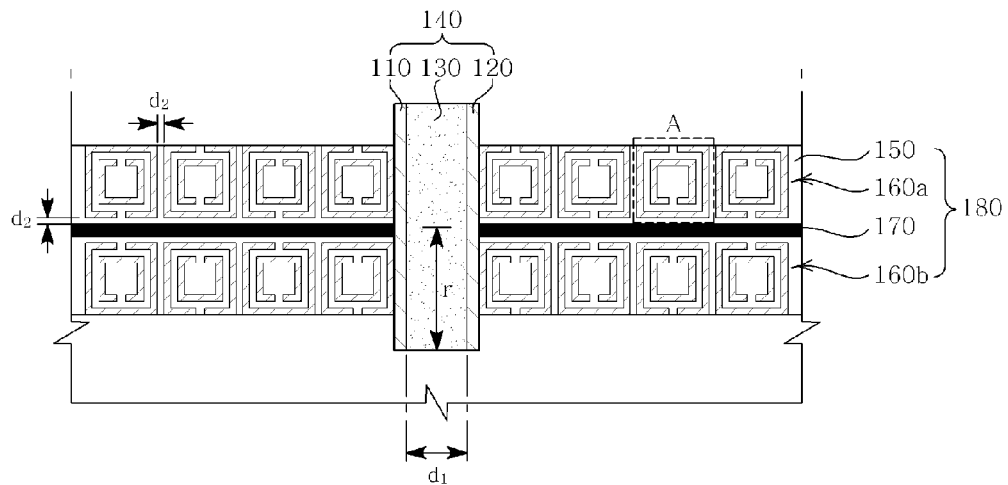
FIG. 2 is an expanded view of part of FIG. 1.

FIG. 1 is a perspective view showing a wireless energy transmission structure according to a first embodiment of the present invention, and FIG. 2 is an expanded view of part of FIG. 1.

With reference to FIG. 1, the wireless energy transmission structure 100 according to the first embodiment of the present invention includes a disc part 140 including first and second conductor plates spaced apart from each other at a predetermined distance and a dielectric material inserted between the two conductor plates, and a ring-shaped wire part 180 connected to both ends of the disc part 140 and having a plurality of meta cells which are repetitively formed.

The disc part 140 functions as a capacitor C in LC resonance based on a magnetic field, and may include the first and second conductor plates 110, 120 spaced to face each other and the dielectric material 130 inserted between the first and second conductor plates 110, 120. When power is applied, an electric field is generated between the first and second conductor plates.

The first and second conductor plates 110, 120 typically have a circular or rectangular shape, but the present invention is not limited thereto. As shown in FIG. 1, it is desirable that the first and second conductor plates 110, 120 have a rectangular shape. This is because the rectangular shape has a larger area to result in greater capacitance and is more easily manufactured, compared to the circular shape, under conditions of the same radius.

The dielectric material 130 inserted between the first and second conductor plates 110, 120 may include air or an additional dielectric material having a predetermined dielectric constant $\in$.

Thus, the magnitude of the electric field occurring from the disc part 140 is determined depending on the size and distance $d_1$ of the first and second conductor plates 110, 120, and the dielectric constant $\in$ of the dielectric material 130.

The wire part 180 functions as an inductor L in LC resonance based on the magnetic field, and may include a ring-shaped single or multilayer substrate 150 connected to both ends of the disc part 140, a meta structure 160 formed on the substrate 150, and a transmission line 170 for supplying or receiving power.

The substrate 150 is a ring-shaped single or multilayer substrate, one end of which is connected to the first conductor plate 110 and the other end of which is connected to the second conductor plate 120.

The meta structure 160 formed on the substrate 150 is physically configured such that one meta cell is repetitively arranged to thus form a plurality of metal cells. The meta structure 160 is provided in a predetermined metal pattern on the substrate 150.

In the first embodiment of the present invention, the meta cell (the slant line portion in A of FIG. 2) having an inner ring and an outer ring in which the gap of the inner ring and the gap of the outer ring are located at opposite positions is used. On the other hand, in a second embodiment which will be described later, a negative portion (the white portion in A of FIG. 2) is used contrary to the first embodiment as a meta cell. However, the present invention is not limited thereto, and the meta cell may be changed into various forms depending on the desired resonance frequency.

The transmission line 170 functions to supply or receive power, and has a first terminal 171 and a second terminal 172, and is formed along the meta structure 160 of the substrate 150.

When a power source (not shown) is connected to the first and second terminals of the transmission line 170 and thus power is applied, current flows to the transmission line 170.

When current is applied to the disc part 140 through the transmission line 170, an electric field occurs, and a magnetic field is induced from the meta structure of the wire part 180 using the electric field.

The magnetic field thus induced is used as a medium for transmitting energy to the space of a wireless energy transceiver.

As shown in FIGS. 1 and 2, the meta structure 160 according to the first embodiment of the present invention is formed on only one surface of the substrate 150.

Specifically, the meta structure 160 is a horizontal type meta structure including a first meta structure 160a in which a plurality of meta cells is repetitively formed along the inner peripheral portion of the substrate 150 on one surface of the substrate 150, and a second meta structure 160b spaced apart from the first meta structure on the same surface where the first meta structure 160a is formed and having a plurality of meta cells which are repetitively formed along the outer peripheral portion of the substrate 150.

The transmission line 170 has first and second terminals 171, 172, is formed along the first and second meta structures 160a, 160b of the substrate 150 between the first meta structure 160a and the second meta structure 160b, and supplies or receives power through the first and second terminals 171, 172.

Figure 3:
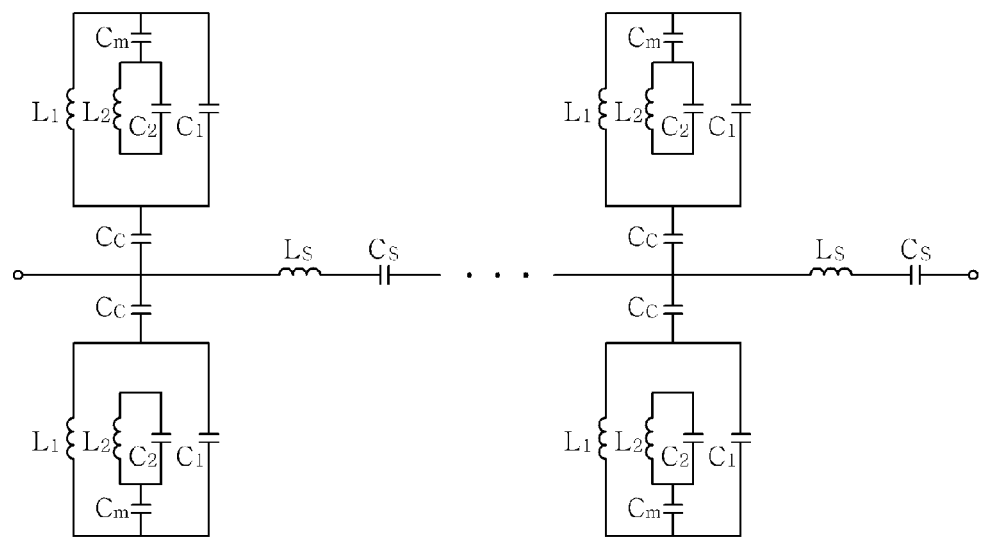
FIG. 3 is an equivalent circuit diagram of the wireless energy transmission structure according to the first embodiment of the present invention.

FIG. 3 is an equivalent circuit diagram of the wireless energy transmission structure according to the first embodiment of the present invention.

In FIG. 3, $C_1$ is the capacitance of the gap of the outer ring of the meta cell, and $L_1$ is the inductance of the outer ring of the meta cell. Also, $C_2$ is the capacitance of the gap of the inner ring of the meta cell, and $L_2$ is the inductance of the inner ring of the meta cell. Also, $C_m$ is the mutual capacitance between the outer ring of the meta cell and the inner ring thereof, and $C_c$ is the coupling capacitance between the meta cell and the power line. Also, $C_s$ is the capacitance of the transmission line 170, and $L_s$ is the inductance of the transmission line 170.

As shown in FIG. 3, the wireless energy transmission structure 100 according to the first embodiment of the present invention acts like a plurality of capacitors and inductors being connected in series/parallel by means of the transmission line 170 and the first and second meta structures 160a, 160b arranged on both sides of the transmission line 170.

For this reason, even when the sizes of the disc part 140 and the wire part 180 are reduced, the meta structure 160 enables the magnitude of the electric and magnetic fields of a conventional wireless energy transmission structure to be increased for an equal amount of power.

Hence, energy may be wirelessly transmitted or received by LC resonance based on the magnetic field formed depending on the magnitude of the electric and magnetic fields.

Figure 4:
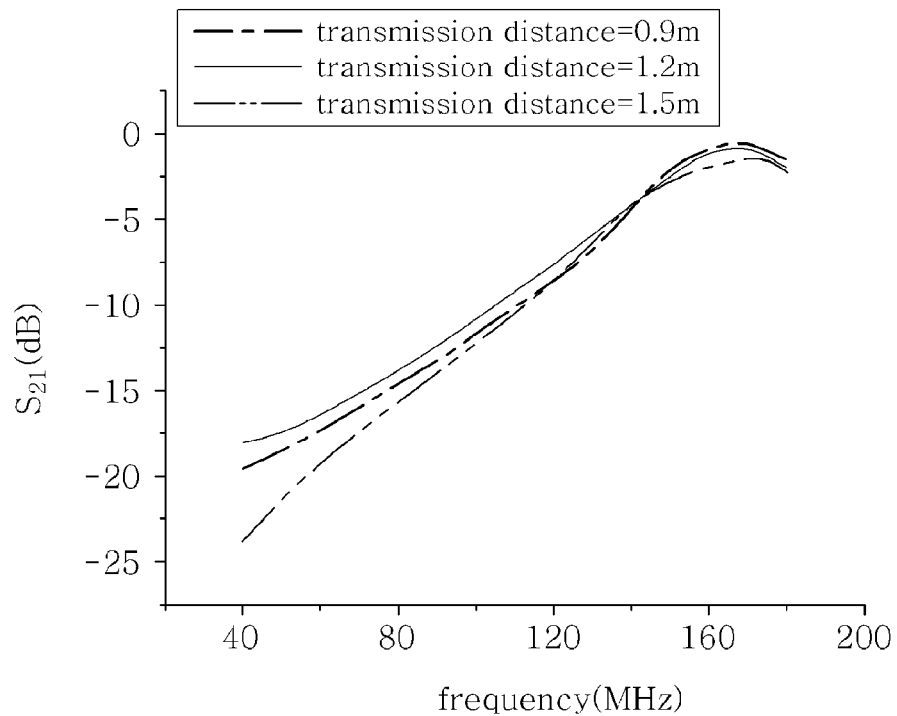
FIG. 4 is a graph showing a gain curve $S_{21}$ depending on the operating frequency and transmission distance of the wireless energy transmission structure according to the first embodiment of the present invention.

FIG. 4 is a graph showing a gain curve $S_{21}$ depending on the operating frequency and transmission distance of the wireless energy transmission structure according to the first embodiment of the present invention.

As such, the design dimension of the wireless energy transmission structure 100 according to the first embodiment of the present invention is as follows.

The radius r of the first and second conductor plates 110, 120 is 10 mm, and the distance $d_1$ between the first and second conductor plates is 0.28 mm. The dielectric constant $\in_1$ of the dielectric material 130 inserted between the first and second conductor plates 110, 120 is 9.2.

Furthermore, the diameter R of the wire part 180 is 100 mm, the dielectric constant $\in_2$ of the substrate 150 used for the wire part 180 is 4.4, and the thickness of the substrate 150 is 2.0 mm.

The distance $d_2$ between the first and second meta structures 160a, 160b and the transmission line 170, which are formed on one surface of the substrate 150, is 0.2 mm, and the distance $d_2$ between the neighboring metal cells and the distance between the outer ring of the meta cell and the inner ring thereof are also 0.2 mm.

As is apparent from FIG. 4, the wireless energy transmission structure 100 thus designed may obtain a maximum gain at a frequency between about 168 MHz and 174 MHz at a transmission distance of 0.9~1.5 m. Thus, the wireless energy transmission structure 100 thus designed has a resonance frequency of about 168~174 MHz.

Figure 5:
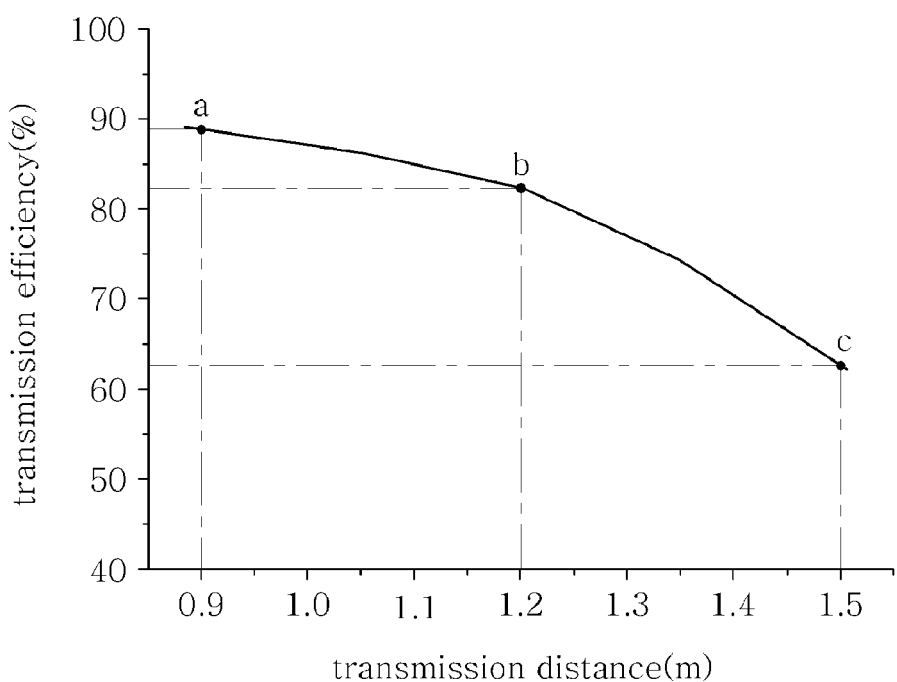
FIG. 5 is a graph showing the transmission efficiency depending on the transmission distance of the wireless energy transmission structure according to the first embodiment of the present invention.

FIG. 5 is a graph showing the transmission efficiency depending on the transmission distance of the wireless energy transmission structure according to the first embodiment of the present invention.

This wireless energy transmission structure 100 is designed as in FIG. 4. FIG. 5 shows the transmission efficiency depending on the transmission distance when a power of 1 W is applied to a wireless energy transceiver using the wireless energy transmission structure 100 at a resonance frequency of about 168~174 MHz.

With reference to FIG. 5, when the transmission distance is 0.9 m at a resonance frequency of about 168~174 MHz, the transmission efficiency (point a) is about 88%. The transmission efficiency (point b) at 1.2 m is about 82%, and the transmission efficiency (point c) at 1.5 m is about 62%.

When the wireless energy transmission structure according to the first embodiment of the present invention is employed in the wireless energy transceiver, the transmission efficiency depending on the transmission distance is slightly decreased, but amounts to about 80% or more within about 1.2 m. From this, the transmission efficiency depending on the transmission distance may be seen to be considerably improved compared to the conventional wireless energy transmission structure having the transmission efficiency of about 60%.

Whereas the conventional wireless energy transmission structure has a size of about 500 mm, the size of the wireless energy transmission structure 100 according to the first embodiment of the present invention may be reduced to about 100 mm.

Figure 6:
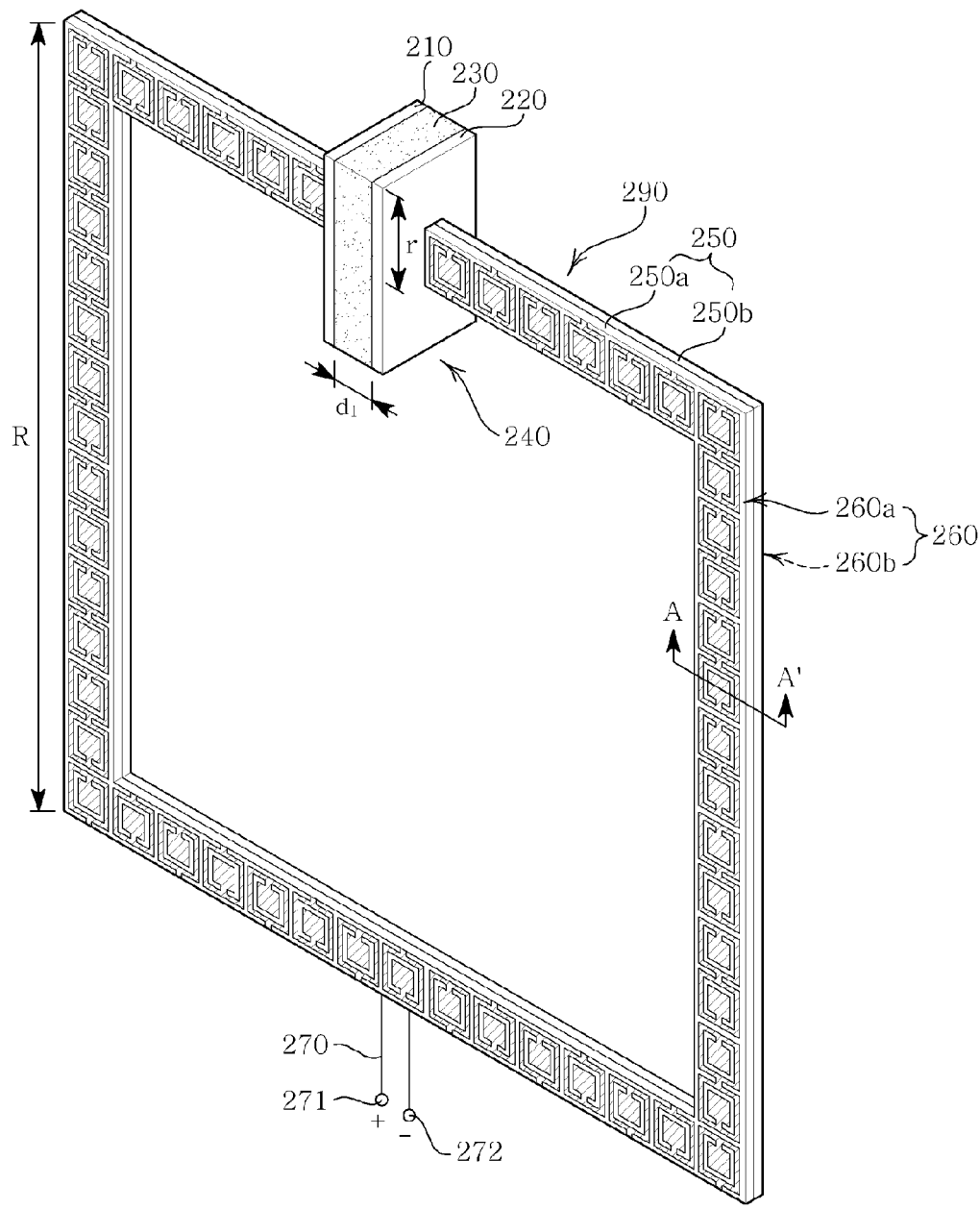
FIG. 6 is a perspective view showing a wireless energy transmission structure according to a second embodiment of the present invention.
Figure 7:
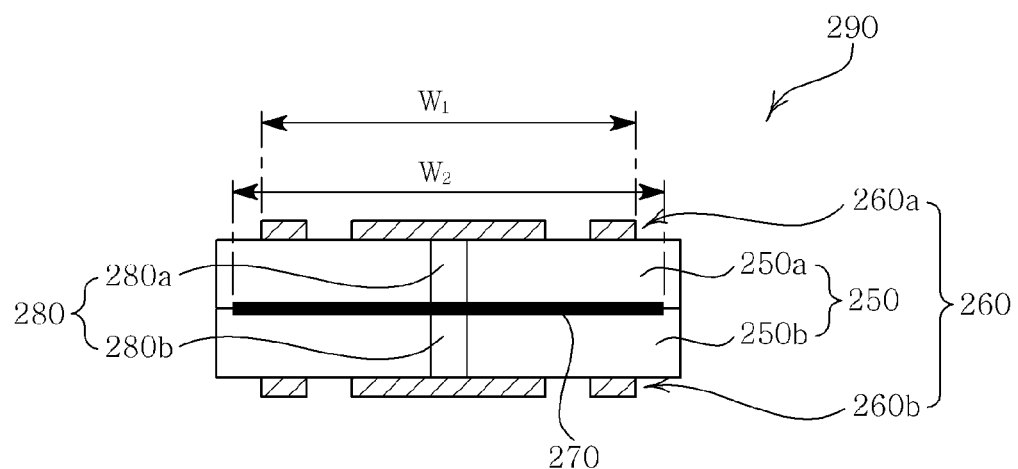
FIG. 7 is a cross-sectional view taken along the line A-A' of FIG. 6.

FIG. 6 is a perspective view showing a wireless energy transmission structure according to a second embodiment of the present invention, and FIG. 7 is a cross-sectional view taken along the line A-A' of FIG. 6.

With reference to FIG. 6, the wireless energy transmission structure 200 according to the second embodiment of the present invention includes a disc part 240 including first and second conductor plates spaced apart from each other at a predetermined distance and a dielectric material inserted between the two conductor plates, and a ring-shaped wire part 290 connected to both ends of the disc part 240 and having a plurality of meta cells which are repetitively formed.

The disc part 240 of the wireless energy transmission structure 200 according to the second embodiment of the present invention is the same as the disc part 140 of the wireless energy transmission structure 100 according to the first embodiment of the present invention, and thus the detailed description thereof is omitted.

The wire part 290 according to the second embodiment of the present invention has a meta structure 260 formed on both (upper and lower) surfaces of a multilayer substrate 250, unlike the wire part 180 according to the first embodiment of the present invention having the meta structure 160 which is formed on only one surface of the substrate 150.

The wire part 290 according to the second embodiment of the present invention functions as an inductor L in LC resonance based on a magnetic field, and may include a ring-shaped multilayer substrate 250 connected to both ends of the disc part 240, a meta structure 260 formed on upper and lower surfaces of the multilayer substrate 250, a transmission line 270 for supplying or receiving power, and a plurality of via holes 280 for electrically connecting the meta structure 260 and the transmission line.

The multilayer substrate 250 is a ring-shaped multilayer substrate, one end of which is connected to the first conductor plate 210 and the other end of which is connected to the second conductor plate 220, and which includes an uppermost substrate 250a and a lowermost substrate 250b so that at least two dielectric substrates are stacked.

Provided on each of the uppermost substrate 250a and lowermost substrate 250b of the multilayer substrate 250 is the meta structure 260.

Specifically, the meta structure 260 is a vertical type meta structure including a first meta structure 260a formed on the upper surface of the uppermost substrate 250a of the multilayer substrate 250 and having a plurality of meta cells which are repetitively formed, and a second meta structure 260b formed on the lower surface of the lowermost substrate 250b of the multilayer substrate 250 and having a plurality of meta cells which are repetitively formed.

The transmission line 270 functions to supply or receive power, has a first terminal 271 and a second terminal 272, and is interposed between the uppermost substrate 250a and the lowermost substrate 250b and formed along the vertical type meta structure 260 of the multilayer substrate 250.

Also, resonance properties may be converted into series resonance or parallel resonance depending on the width $W_2$ of the transmission line 270, which is specifically described later with reference to FIGS. 9 to 12.

The plurality of via holes 280 is formed to perpendicularly pass through the multilayer substrate 250 so as to electrically connect the plurality of meta cells and the transmission line 270.

Specifically, the plurality of via holes 280 includes a plurality of first via holes 280a formed to perpendicularly pass through the multilayer substrate 250 so as to electrically connect the plurality of metal cells of the first meta structure 260a to the transmission line 270, and a plurality of second via holes 280b formed to perpendicularly pass through the multilayer substrate 250 so as to electrically connect the plurality of metal cells of the second meta structure 260b to the transmission line 270.

As in the first embodiment of the present invention, when a power source (not shown) is connected to the first and second terminals 271, 272 of the transmission line 270 and thus power is applied, current flows to the transmission line 270. When current is applied to the disc part 240 through the transmission line 270, an electric field occurs, and a magnetic field is induced from the meta structure 260 of the wire part 290 using the electric field.

The magnetic field thus induced is a medium for transmitting energy to the space of a wireless energy transceiver.

Figure 8:
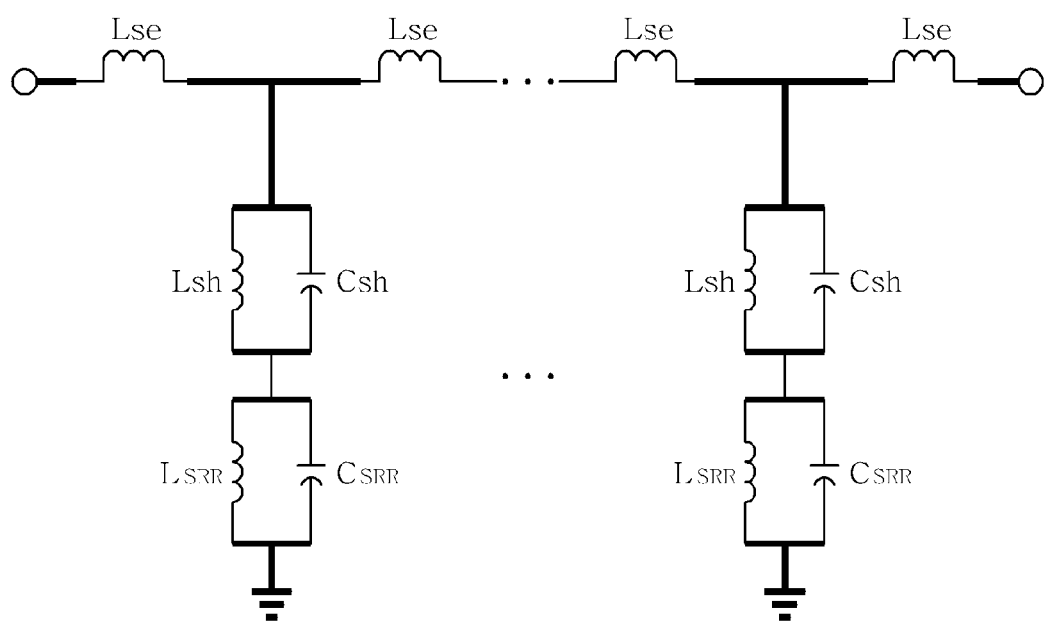
FIG. 8 is an equivalent circuit diagram of the wireless energy transmission structure according to the second embodiment of the present invention.

FIG. 8 is an equivalent circuit diagram of the wireless energy transmission structure according to the second embodiment of the present invention.

In FIG. 8, $L_{se}$, is series inductance, $L_{sh}$ is parallel inductance, and $C_{sh}$ is parallel capacitance. Furthermore, $L_{SRR}$ is the inductance by the meta cells, and $C_{SRR}$ is the capacitance by the meta cells.

As shown in FIG. 8, the wireless energy transmission structure 200 according to the second embodiment of the present invention acts like a plurality of capacitors and inductors being connected in series/parallel by means of the transmission line 270 and the first and second meta structures 260a, 260b arranged on the upper and lower surfaces of the multilayer substrate 250.

For this reason, even when the size of the disc part 240 and the wire part 290 is reduced, the meta structure 260 enables the magnitude of the electric and magnetic fields of a conventional wireless energy transmission structure to be increased for an equal amount of power.

Thus, energy may be wirelessly transmitted and received by LC resonance based on the magnetic field formed depending on the magnitude of the electric and magnetic fields.

In addition, the wireless energy transmission structure 200 according to the second embodiment of the present invention may change series/parallel resonance properties by changing the width $W_2$ of the transmission line without changing the width $W_1$ of the meta structure.

FIGS. 9 to 12 show the conversion of series/parallel resonance properties depending on the widths of the meta structure and the transmission line of the wireless energy transmission structure according to the second embodiment of the present invention.

The design dimension of the wireless energy transmission structure 200 according to the second embodiment of the present invention used in FIGS. 9 to 12 is as follows.

The radius r of the first and second conductor plates 210, 220 is 20 mm, and the distance $d_1$ between the first and second conductor plates is 0.28 mm. The dielectric constant $\epsilon_1$ of the dielectric material 230 inserted between the first and second conductor plates 210, 220 is 9.2.

The diameter R of the wire part 290 is 100 mm, the dielectric constant $\epsilon_2$ of the multilayer substrate 250 used for the wire part 290 is 4.4, and the thickness of the multilayer substrate 250 is 2.0 mm.

The distance $d_2$ between the neighboring meta cells of the meta structure 260 and the distance between the outer ring of the meta cell and the inner ring thereof are also 0.2 mm.

Figure 9:
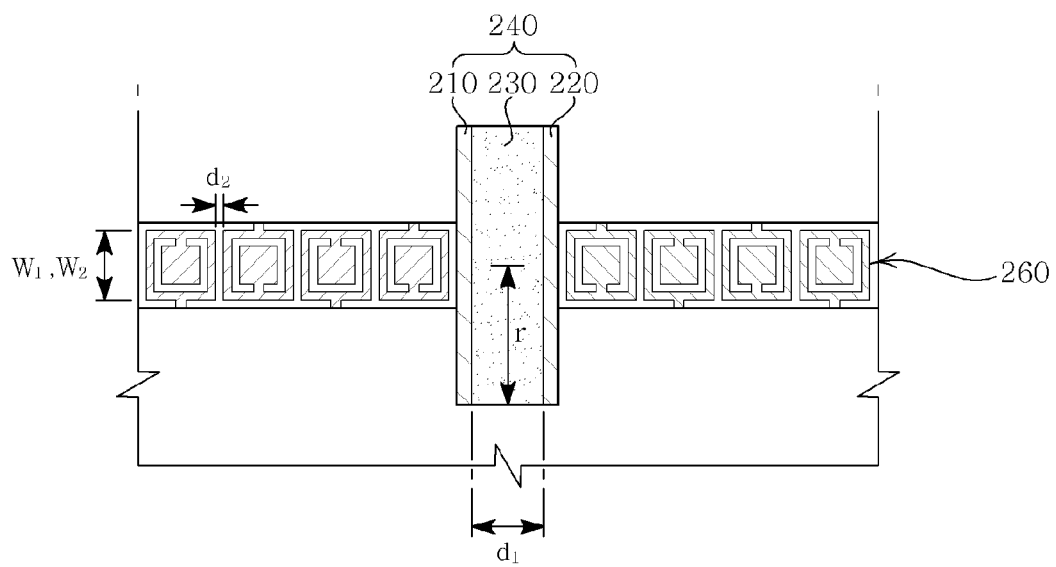
FIGS. 9 to 12 are views showing the conversion of series/parallel resonance properties depending on the widths of meta structure and transmission line of the wireless energy transmission structure according to the second embodiment of the present invention.
Figure 10:
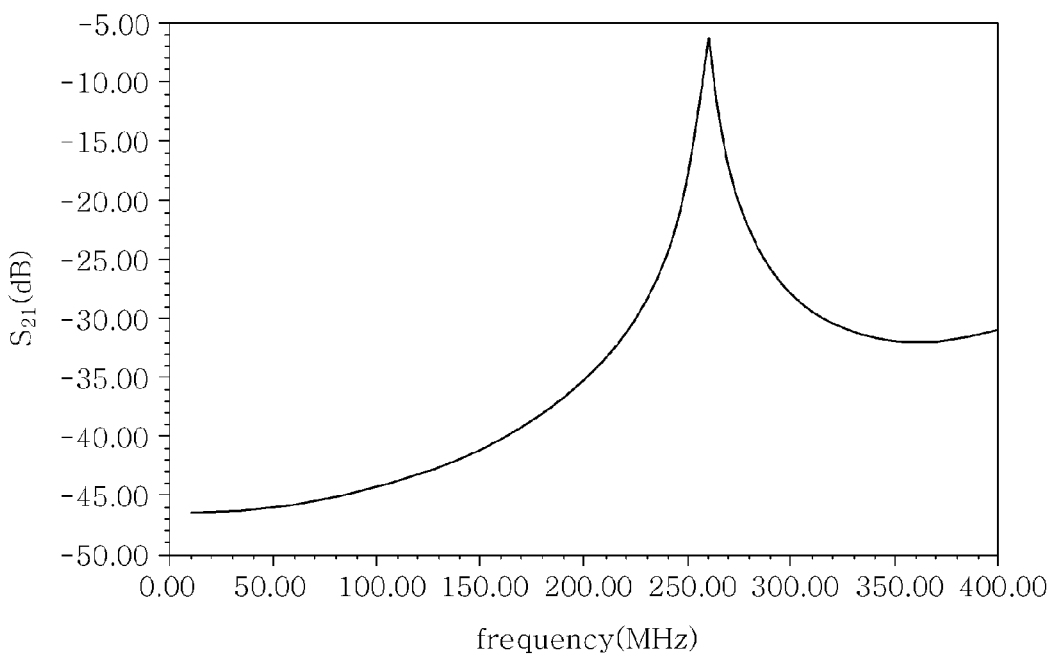

In the case where the width $W_2$ of the transmission line is equal to the width $W_1$ of the meta structure ($W_2=W_1$) as shown in FIG. 9, the wireless energy transmission structure 200 according to the second embodiment of the present invention may obtain a gain curve depending on the frequency as shown in FIG. 10.

The graph of FIG. 10 shows series resonance properties in which the gain curve achieves a maximum at the resonance frequency (about 250~300 MHz).

Although not shown, even in the case where the width $W_2$ of the transmission lien is larger than the width $W_1$ of the meta structure ($W_2>W_1$), a graph showing series resonance properties similar to those of FIG. 10 is represented.

Figure 11:
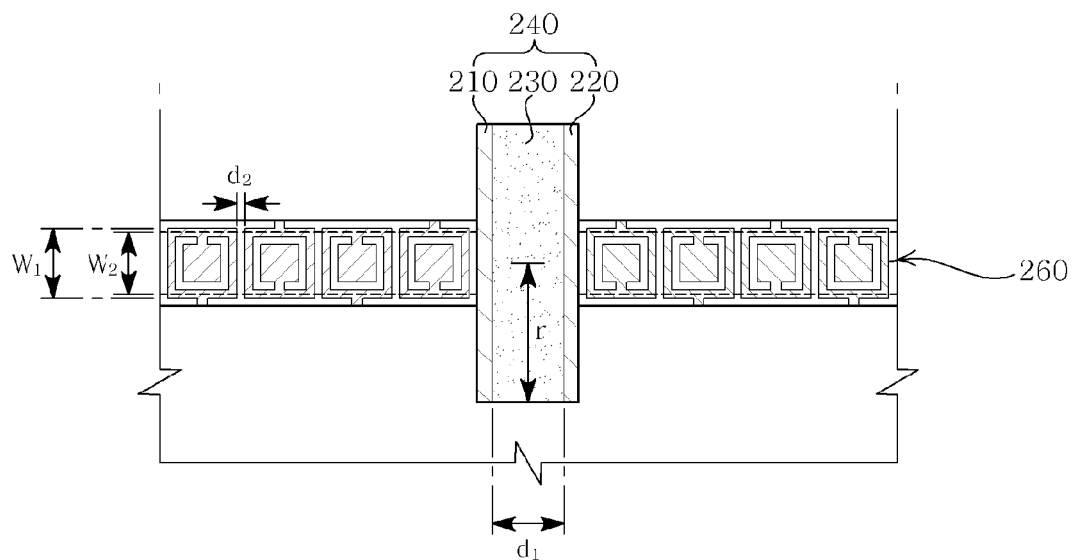
Figure 12:
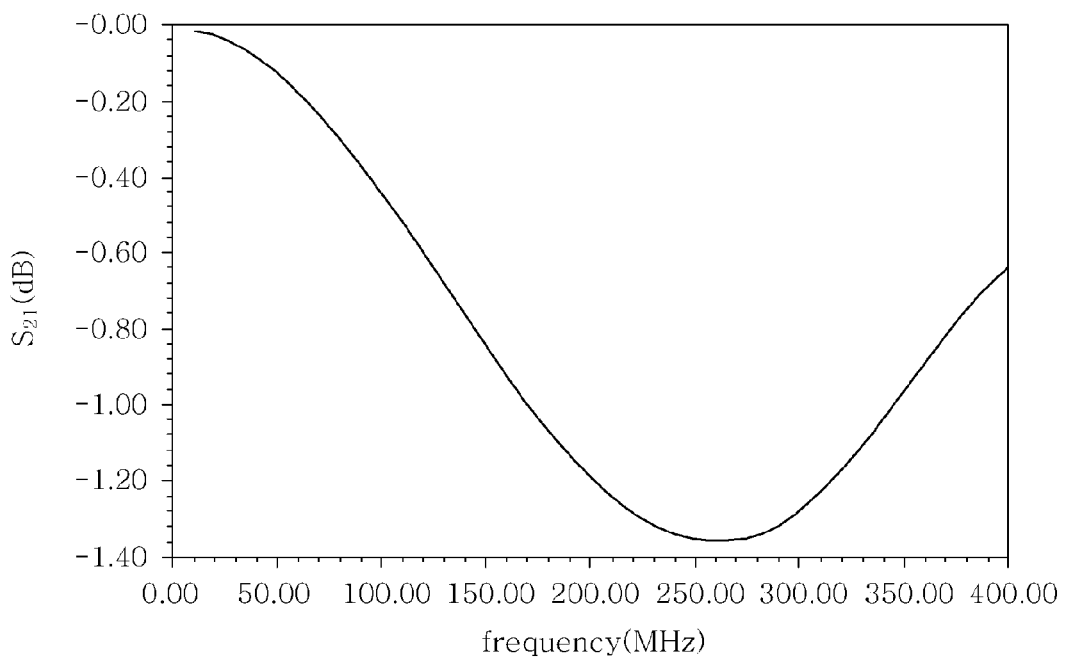

As shown in FIG. 11, in the case where the width $W_2$ of the transmission lien is smaller than the width $W_1$ of the meta structure ($W_2<W_1$), the wireless energy transmission structure 200 according to the second embodiment of the present invention may obtain a gain curve depending on the frequency as shown in FIG. 12.

The graph of FIG. 12 shows parallel resonance properties in which the gain curve achieves a minimum at the resonance frequency (about 250~300 MHz).

As shown in FIGS. 9 to 12, in order to obtain the desired resonance frequency using series/parallel resonance conversion, it is possible to control the width $W_2$ of the transmission line.

As mentioned above, when the wireless energy transmission structure 100, 200 according to the first and second embodiments of the present invention is applied to a wireless energy transceiver, the transmission distance and transmission efficiency may be greatly improved because of the capacitance and inductance by the meta structure 160, 260. Also, because the wavelength is not affected by the size of the structure, the size of the structure may be reduced.

The width of the transmission line may be controlled without changing the size and position of the meta cells, thus enabling series/parallel resonance conversion at the resonance frequency and facilitating manufacture of the structure.

As described hereinbefore, the present invention provides a wireless energy transmission structure. According to the present invention, the wireless energy transmission structure has a meta structure, and is thus reduced in size and improved in transmission distance and transmission efficiency for an equal amount of power.

Also, according to the present invention, the wireless energy transmission structure enables the conversion of series/parallel resonance properties depending on the width of the transmission line, thus making it easy to manufacture a wireless energy transmission structure operating at the necessary resonance frequency.

Although the embodiments of the present invention have been disclosed for illustrative purposes, those skilled in the art will appreciate that a variety of different modifications, additions and substitutions are possible, without departing from the scope and spirit of the invention as disclosed in the accompanying claims. Accordingly, such modifications, additions and substitutions should also be understood as falling within the scope of the present invention.

What is claimed is:

1. A wireless energy transmission structure, comprising:
   a disc part comprising a first conductor plate and a second conductor plate which are spaced to face each other and a dielectric material inserted between the first conductor plate and the second conductor plate, and generating an electric field between the first conductor plate and the second conductor plate; and
   a ring-shaped wire part one end of which is connected to the first conductor plate and the other end of which is connected to the second conductor plate, and having a meta structure in which a plurality of meta cells is repetitively arranged so as to induce a magnetic field using the electric field.

2. The wireless energy transmission structure as set forth in claim 1, wherein the wire part comprises:
   a ring-shaped substrate one end of which is connected to the first conductor plate and the other end of which is connected to the second conductor plate;
   a horizontal type meta structure comprising a first meta structure in which a plurality of meta cells is repetitively formed along an inner peripheral portion of the substrate on one surface of the substrate, and a second meta structure spaced apart from the first meta structure on the same surface where the first meta structure is formed and having a plurality of meta cells which are repetitively formed along an outer peripheral portion of the substrate; and
   a transmission line, which has a first terminal and a second terminal, is formed along the first meta structure and the second meta structure of the substrate between the first meta structure and the second meta structure, and supplies or receives power through the first terminal and the second terminal.

3. The wireless energy transmission structure as set forth in claim 2, wherein the substrate is a single substrate.

4. The wireless energy transmission structure as set forth in claim 2, wherein the substrate is a multilayer substrate.

5. The wireless energy transmission structure as set forth in claim 1, wherein the wire part comprises:
   a ring-shaped multilayer substrate one end of which is connected to the first conductor plate and the other end of which is connected to the second conductor plate, and including an uppermost substrate and a lowermost substrate so that at least two dielectric substrates are stacked;
   a vertical type meta structure comprising a first meta structure formed on an upper surface of the uppermost substrate of the multilayer substrate and having a plurality of meta cells which are repetitively formed, and a second meta structure formed on a lower surface of the lowermost substrate of the multilayer substrate and having a plurality of meta cells which are repetitively formed;
   a transmission line, which has a first terminal and a second terminal, is interposed between the uppermost substrate and the lowermost substrate and formed along the first meta structure and the second meta structure of the substrate, and supplies or receives power through the first terminal and the second terminal; and
   a plurality of via holes formed to perpendicularly pass through the multilayer substrate so as to electrically connect the plurality of meta cells and the transmission line.

6. The wireless energy transmission structure as set forth in claim 5, wherein when a width of the transmission line is equal to or larger than a width of the first meta structure and the second meta structure, series resonance is obtained at a resonance frequency.

7. The wireless energy transmission structure as set forth in claim 5, wherein when a width of the transmission line is smaller than a width of the first meta structure and the second meta structure, parallel resonance is obtained at a resonance frequency.

8. The wireless energy transmission structure as set forth in claim 5, wherein the plurality of via holes comprises:
   a plurality of first via holes formed to perpendicularly pass through the multilayer substrate so as to electrically connect the plurality of meta cells of the first meta structure to the transmission line; and
   a plurality of second via holes formed to perpendicularly pass through the multilayer substrate so as to electrically connect the plurality of meta cells of the second meta structure to the transmission line.

* * * * *